United States Patent [19]

Rogalsky

[11] Patent Number: 5,791,128
[45] Date of Patent: Aug. 11, 1998

[54] REVERSIBLE HYDRAULIC DRIVE APPARATUS

[75] Inventor: Douglas Keith Rogalsky, Springfield, Canada

[73] Assignee: MacDon Industries Ltd., Winnipeg, Canada

[21] Appl. No.: 677,679

[22] Filed: Jul. 8, 1996

[51] Int. Cl.$^6$ .......................... A01D 34/00; A01D 69/00
[52] U.S. Cl. .................. 56/14.5; 36/10.9; 60/484
[58] Field of Search ...................... 56/14.5, 14.6, 56/10.9, 11.9, 11.2; 400/70; 460/114; 60/484, 464

[56] References Cited

U.S. PATENT DOCUMENTS

| | | | |
|---|---|---|---|
| 4,218,864 | 8/1980 | Allemeersch et al. | 56/11.2 |
| 4,430,847 | 2/1984 | Tourdot et al. | 56/11.2 X |
| 4,470,243 | 9/1984 | Rayfield | 56/11.2 |
| 4,512,139 | 4/1985 | Musser et al. | 56/11.2 |
| 4,550,465 | 11/1985 | Chrisley | 56/328.1 X |
| 4,663,919 | 5/1987 | Stroh et al. | 56/11.2 |
| 5,293,730 | 3/1994 | Bich et al. | 56/14.6 X |
| 5,462,486 | 10/1995 | Norton | 56/11.2 X |

Primary Examiner—Tamara L. Graysay
Assistant Examiner—Thomas A. Beach
Attorney, Agent, or Firm—Adrian D. Battison; Murray E. Thrift

[57] ABSTRACT

A hydraulic drive apparatus for example for driving the header of a combine harvester includes a pump, at least one motor driven by the pump, a reservoir in which the hydraulic fluid is cooled and degasified and a hydraulic circuit connecting the elements. The pump is driven by a shaft of the combine which can be reversed for short periods of time for discharging blockages. The hydraulic circuit is arranged with check valves so that when operating in the normal forward condition it operates in open circuit arrangement including the reservoir. When operating in the reverse condition, the reservoir is bypassed and the fluid is directed in closed circuit condition from the pump through the motor and back to the pump. This allows the drive apparatus to accommodate the necessary reverse condition for short periods of time using a simple hydraulic circuitry rather than the conventional mechanical drive arrangements.

14 Claims, 2 Drawing Sheets

REVERSIBLE HYDRAULIC DRIVE APPARATUS

BACKGROUND OF THE INVENTION

This invention relates to a hydraulic drive apparatus which includes a hydraulic pump which can be driven in a forward direction and also in a reverse direction together with a hydraulic motor which receives hydraulic fluid from the pump for driving the motor in a forward direction and also in a reverse direction.

Hydraulic circuits including a pump for generating high pressure fluid and a motor driven by the high pressure are generally either arranged in an open circuit condition or a closed circuit condition.

Open circuit hydraulic circuits include a reservoir which is open, that is, it is in contact with atmospheric air. Hydraulic fluid for the pump is drawn from the reservoir and a hydraulic fluid from the motor is returned to the reservoir. All fluid therefore flowing through the circuit passes through the reservoir and the reservoir is used to maintain a filled condition of the circuit to accommodate the losses which necessarily occur in the pump and motor. In addition the reservoir allows the release of air which becomes entrapped in the hydraulic fluid due to the action of the pump and motor. It is well known that the entrapment of air in small bubbles during the compression of the fluid causes expansion of the bubbles when the pressure is reduced. The hydraulic pump and motor can be damaged if the amount of air in the fluid exceeds a predetermined maximum. Yet further, the reservoir provides a cooling effect for the fluid to prevent overheating as the fluid is repeatedly circulated through the circuit.

Open circuit arrangements are used conventionally when the pump and motor are intended to be driven only in a single direction.

Closed circuit arrangements do not include the open reservoir but instead provide a closed path for the hydraulic fluid so that same hydraulic fluid discharged from the pump under pressure is fed through the motor and is fed back to the pump for re-pressurization. Such closed circuit arrangements thus require complex feeding, cooling and filtering systems to maintain the closed circuit properly filled and cooled, and to avoid accumulation of air bubbles.

Such closed circuits are conventionally used when the pump and motor are intended to be reversed in direction for example in transmission systems so that the closed circuit is used both in the forward and rearward directions.

Up till now, therefore, there has been no way to provide a reversible hydraulic circuit arrangement which utilizes the simpler and more effective open circuit technique.

SUMMARY OF THE INVENTION

It is one object of the present invention, therefore, to provide an improved hydraulic drive apparatus which allows a reversible arrangement of a pump and motor while utilizing the open circuit system.

According to one aspect of the invention there is provided a hydraulic drive apparatus comprising: a hydraulic pump connected to an input drive member by which the pump is driven to generate pressure in a hydraulic fluid, the pump having a first port and a second port; a direction of drive of the drive member being reversible so that a direction of drive of the pump is reversible between a forward direction to intake fluid into the first port and expel pressurized fluid at the second port and a reverse direction to take intake fluid into the second port and expel pressurized fluid at the first port; a motor driven by the pressurized fluid from the pump, the motor having a first port and a second port arranged such that supply of the pressurized fluid to the first port drives the motor in a forward direction and releases discharge fluid at the second port and such that supply of the pressurized fluid to the second port drives the motor in a reverse direction and releases discharge fluid at the first port; and a hydraulic circuit for connecting the pump and the motor, the hydraulic circuit comprising: a hydraulic fluid reservoir for receiving the discharge fluid from the motor and for supplying hydraulic intake fluid to the pump; a first hydraulic circuit portion including a first hydraulic line connecting fluid from the reservoir to the first port of the pump, a second hydraulic line connecting fluid between the second port of the pump and the first port of the motor, and a third hydraulic line connecting fluid from the second port of the motor to the reservoir; a second hydraulic circuit portion including a fourth hydraulic line connecting fluid from the second port of the motor to the first port of the pump; and valve means for controlling flow of fluid in the first and second hydraulic circuit portions, the valve means being operable in response to a change in the direction of drive of the pump such that, when the pump is driven in the forward direction, the hydraulic circuit causes the hydraulic fluid to pass through the first hydraulic circuit portion into and from the reservoir and, when the pump is driven in the reverse direction, the hydraulic circuit causes the hydraulic fluid to pass through the second hydraulic circuit portion by-passing the reservoir.

Preferably the valve means includes: a first one-way check valve in the first line preventing flow of fluid back to the reservoir; a second one-way check valve in the fourth line preventing flow of fluid from the first port of the pump to the second port of the motor; and a third check valve to prevent flow of fluid from the second port of the motor to the reservoir, the third check valve being operable in response to driving of the pump in the forward direction to allow flow of fluid from the second port of the motor to the reservoir.

The hydraulic drive apparatus is particularly but not exclusively designed for use in driving the feeder elements of a header of a combine harvester and accordingly a further aspect of the present invention provides an improved header drive apparatus which incorporates the above hydraulic drive apparatus.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 2:
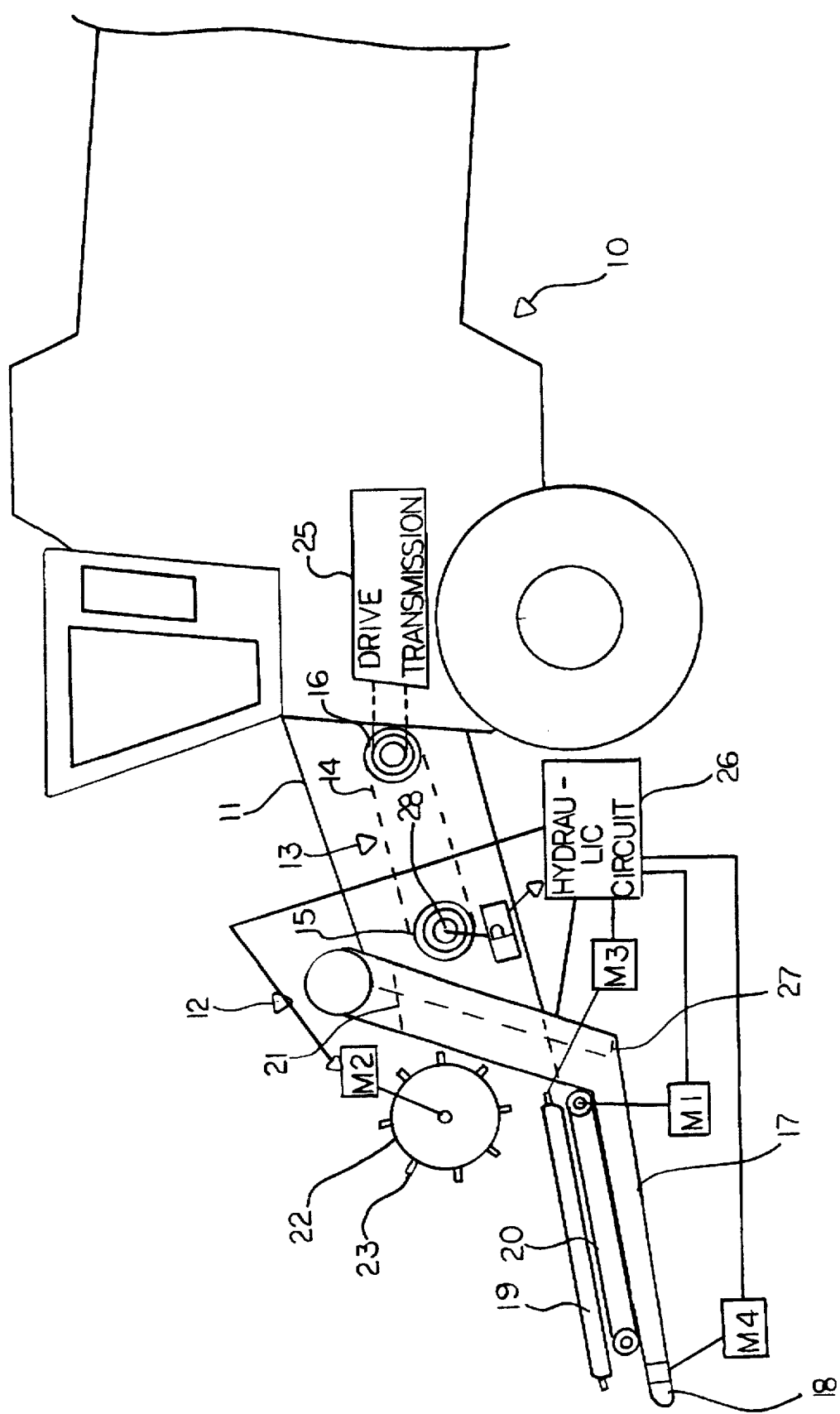
FIG. 2 is a schematic illustration of a combine harvester and header utilizing the hydraulic drive apparatus of FIG. 1.

One example for use of a hydraulic circuit of the present invention is shown in FIG. 2 which shows a combine harvester generally indicated at 10 having a feeder housing 11 mounted at a forward end of the combine harvester for attachment to a header 12 carried on the feeder housing for feeding a cut crop into the feeder housing for threshing within the combine harvester body. The feeder housing comprises a tubular body within which is mounted a feeder chain assembly 13 comprising a chain 14 and a pair of drive sprockets 15 and 16. The chain carries a plurality of slats which carries the crop material between the underside of the chain and the upper surface of a bottom wall of the feeder housing.

The header 12 comprises a header frame 17 at a forward end of which is mounted a cutting knife 18 extending across the full width of the header frame. On top of the frame is mounted a pair of transport drapers 19 which feed the cut crop material from the knife 18 to a center section of the header located at the feeder housing 11. At the center section is provided a feed draper 20 which is arranged to carry the cut crop from the transport drapers 19 rearwardly through an opening 21 in the header into the feeder housing. The feeding action of the feed draper 20 is assisted by a feed roller 22 located above a rear end of the feed draper which may carry a plurality of radially extending paddles 23.

The above elements of the header are shown and described only briefly since these are well known to one skilled in the art from the product manufactured by the present assignees and known as "Harvest Header" (trademark) some aspects of which are shown in U.S. Pat. No. 4,956,966 of the present assignees.

The feeder chain assembly 13 is driven by a suitable drive transmission generally indicated at 25 connected from the power source of the combine harvester. The drive transmission acts to drive the feeder chain assembly in the required direction to feed the material into the combine harvester. In addition it is well known that combine harvesters include a reverser system for reversing the drive to the feeder chain assembly in order to back feed the crop material in the event that a blockage occurs in the feeder housing or at the cylinder at the top of the feeder housing.

It is also desirable on reversing the feeder chain assembly to reverse the drive to the feed draper 20 and to the feed roller 22. This can be carried out using a mechanical drive system but this is inconvenient as the mechanical drive system must be located closely adjacent the ground and thus is accessible to contamination.

The drive system for the elements of the header is therefore provided a hydraulic drive apparatus including a pump P, drive motors M1, M2, M3 and M4 together with a hydraulic control circuit 26 including a reservoir 27 mounted on the frame 17.

Figure 1:
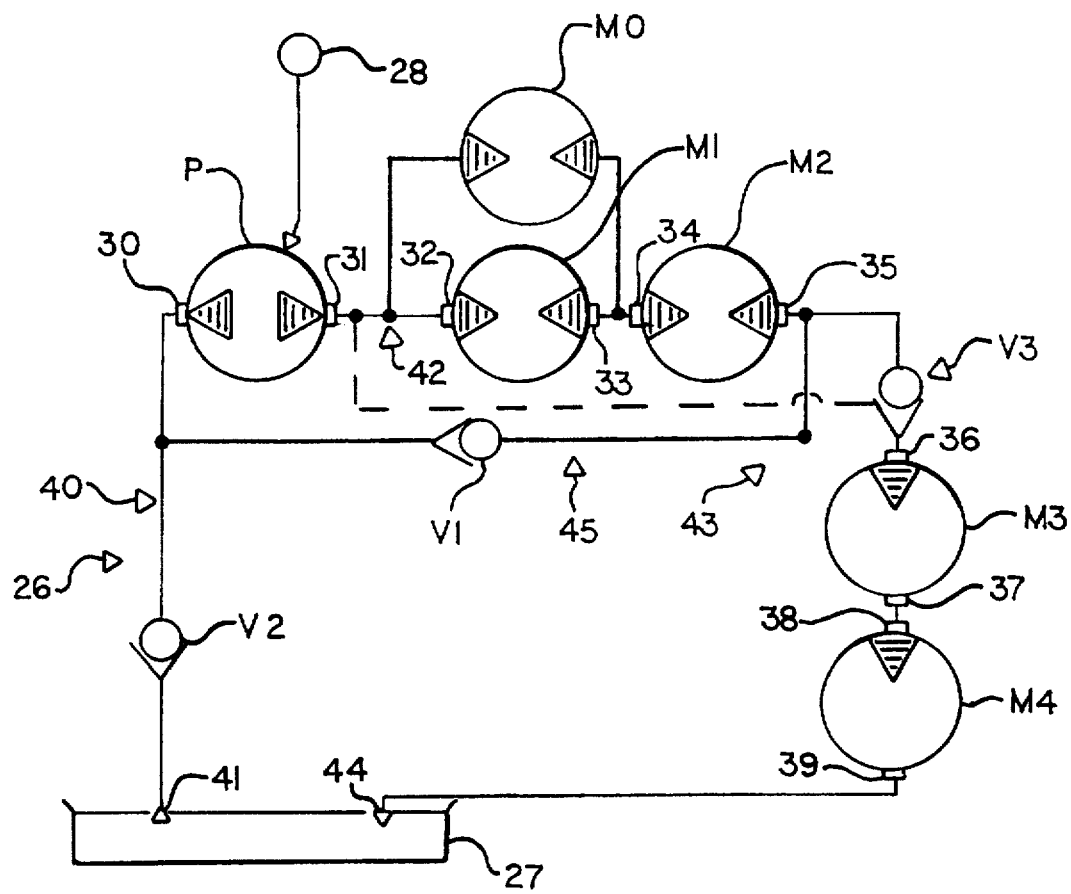
FIG. 1 is a schematic illustration of a hydraulic circuit according to the present invention.

The hydraulic circuit is shown schematically in FIG. 1. The symbols used for the pump and motors are well known and widely used by persons skilled in the art. Each symbol comprises a circle. The symbol for the pump includes two arrows pointed outwardly of the circle. A pump with two arrows indicates a reversible pump. Similarly the symbol for a motor includes one or two arrows with the arrows being directed inwardly of the circle. A circle having two such arrows indicates a reversible motor. A symbol having only one such arrow indicates a motor which is not reversible and therefore drivable only in a single direction. Each motor has an output shaft (not shown) which acts to drive the required element as previously described. The pump P includes an input shaft 28 which is the shaft of one of the sprockets 15, 16 which is mechanically connected thereto. It will be appreciated therefore that the shaft 28 can be driven in a forward direction when the feeder chain assembly is feeding the material in the required feed direction and also in a reverse direction when a reverse action is effected to discharge the material from the feeder housing.

In addition to the motors M1, M2, M3 and M4, there is shown also an additional motor M0 which is connected in parallel to the motor M1 and which can be used for driving other elements of the header. The pump P and the motors are interconnected by the hydraulic circuit 26 which includes the reservoir 27. Furthermore the hydraulic circuit includes three check valves V1, V2 and V3. Each of these check valves V1 and V2 is a one way check valve. The symbol used for these valves is a conventional symbol which illustrates schematically a circular valve and a V-shaped seat which allows free flow of fluid from the seat past the circular valve body but prevents flow in the opposite direction where the valve body is forced into the seat.

The valve V3 can also be a one way check valve but this valve is pilot operated so that injection of fluid from the pilot line shown as a dash line allows flow through the check valve in the normally locked position into the seat.

The pump P has a first port 30 to the pump and a second port 31. The motor M1 has a first port 32 and a second port 33. The motor M2 has a first port 34 and a second port 35. The motor M3 has a first port 36 and a second port 37. The motor M4 has a first port 38 and a second port 39.

The hydraulic circuit comprises a first hydraulic line 40 extending from an intake end 41 at the reservoir 27 to the port 30. The circuit further includes a second hydraulic line extending from the port 31 to the port 32. The circuit further includes a third hydraulic line generally indicated at 43 which connects from the second port 33 of the motor M1 to a discharge 44 into the reservoir.

The motor M2 is connected in series in the hydraulic line 43 so that fluid flowing along the line 43 enters the motor M2 at the port 34 and exits at the port 35. Similarly the motors M3 and M4 are connected in series in the hydraulic line 43.

The circuit further includes a fourth hydraulic line 45 which connects between the first port 30 of the pump P and the second port 35 of the motor M2. In an arrangement with only the motor M1, it will be appreciated that the fourth line will connect to the port 33 of the motor M1. The fourth line 45 is thus connected to the line 43 at a position downstream of the port 33 and downstream of the motor M2.

The check valve V1 is mounted in the fourth line and arranged to allow flow of fluid from the port 30 to the port 33 but to prevent reverse flow of fluid. The check valve V2 is provided in the line 40 and is arranged to allow flow of fluid from the intake 41 to the port 30 but to prevent flow of fluid in the opposite direction. The valve V3 is arranged to prevent flow of fluid from the port 33 to the discharge 44 through the motors M2, M3 and M4 except when the pressure in the line 42 is high thus operating to open the valve V3 and allow the flow through the line 43 to a discharge 44.

In a normal forward direction of operation of the circuit, the pump P operates to intake fluid at the port 30 and generate pressure at the port 31. This pressurized fluid from the port 31 is communicated through the line 43 and acts as a pilot pressure to open valve V3. The fluid pressure from the pump P therefore operates to rotate the motors M0, M1, M2, M3 and M4 in the forward direction of operation. This circuit portion defined by the lines 40, 42 and 43 operates in open circuit condition so that the fluid is passed through the reservoir where the fluid is cooled and degasified and so that any losses through the pump and motors can be made up by topping up the reservoir.

When the pump P is driven in the reverse direction by the shaft 28, fluid in the circuit is pumped from the port 31 which becomes an intake port to the port 30 which becomes the pressurized port. The valve V2 prevents the flow of fluid to the reservoir and causes the fluid to flow through the second circuit portion 45 back through the motor M2 to the port 33 of the motor M1. The motors M1 and M2 are therefore driven in the reverse direction and the fluid flows back from the port 32 of the motor M1 through the line 42 to the port 31 of the pump. As the pressure at the port 31 is low, the valve V3 remains closed so that the fluid is prevented from flowing from the line 45 through the line 43 to the reservoir.

In the reverse flow condition, therefore, the circuit operates a closed circuit containing only the pump P and the motors M0, M1 and M2. As there is no flow through the motors M3 and M4, these motors simply stop and are disconnected from the circuit.

As the reverse flow condition is maintained only for a short period during the time when the blockage is displaced, it is possible for the circuit to operate as a closed circuit without excess heating of the fluid and without causing damage to the pump and motors due to the presence of gas in the fluid. It is not intended however that the circuit operate for extended periods in the reverse flow condition.

Once the normal forward flow condition is recommenced, the fluid in the circuit is again cooled and degasified in the reservoir.

It will be appreciated that the circuit can operate with a single motor M1 in which case the line 43 is directly connected between the port 33 and the discharge 44 and the line 45 is connected to the port 33. The circuit can also cooperate in an arrangement in which all of the motors are reversed in which case the motors M3 and M4 are of the reversible type, the valve V3 is located at the port 39 of the motor M4 and the line 45 is connected to the port 39 of the motor M4.

While the valve arrangement in the hydraulic circuit described above is actuated by fluid pressure generated by the pump, it is also possible to actuate the valve arrangement to convert from the open circuit condition in forward flow to the closed circuit condition in reverse flow by elements otherwise responsive to a change from forward to reverse direction. Such devices may simply be motion sensors which are responsive to the motion of the primary drive input.

Figure 3:
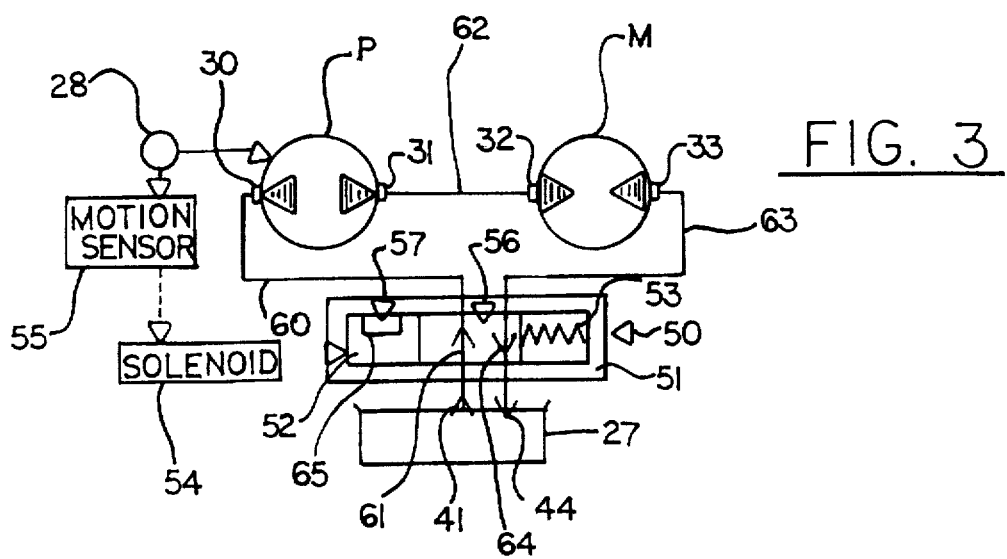
FIG. 3 is a schematic illustration of a second hydraulic circuit according to the present invention.

In FIG. 3 is shown a modified arrangement which does not use check valves but instead uses a piston-type valve. Thus in the simple circuit shown in FIG. 3, the pump P is different from the shaft 28 and is again reversible as previously described. The pump P has ports 30 and 31 as previously described. The circuit further includes a motor M and in this case there is shown only one motor although of course additional motors may be employed. The motor M has ports 32 and 33 as previously described.

The apparatus further includes a reservoir 27. The pump P, motor M and reservoir are indicated by hydraulic circuit including a valve generally indicated at 50. The valve 50 shown only schematically includes a valve body 51 with a piston 52 slidable within the valve body. The piston 52 is biased to a first position by a spring 53 and can be moved against the spring bias to a second position by a solenoid 54 actuated in response to a motion sensor 55 which detects changes in direction of the shaft 28. The valve is shown schematically in the normal first position indicated at 56 and is movable so that the second position 57 moves to the right against the bias of the spring.

The hydraulic circuit further includes a first line 60 which communicates from the reservoir as indicated at port 41. The line 60 communicates through a line portion 61 in the valve piston 52 in the normal first position 56. The hydraulic circuit includes a second hydraulic line 62 communicated from the port 31 of the pump to the port 32 of the motor. The hydraulic circuit includes a further hydraulic line 63 connecting to a port 44 at the reservoir from the port 33 of the motor. The line 63 includes a portion 64 at the first position of the valve.

In a normal forward direction of the pump P, therefore, the hydraulic circuit acts as an open circuit through the reservoir 27 using the first portion of the valve piston.

The hydraulic circuit further includes a line portion provided in the valve piston which, when moved to the right as shown connects to the lines 60 and 63 so as to provide a hydraulic line connection between the port 30 of the pump and the port 33 of the motor.

In the event therefore that a reverse rotation of the pump is detected, the valve piston 52 is moved to the right so that the second portion 57 is aligned with the ports of the valve and the line portion 65 acts to provide a closed loop connection between the pump P and the motor M.

The motion sensor and solenoid can be replaced by a pilot operated pressure line responsive to pressure from the pump at the port 30.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A hydraulic drive apparatus comprising:
    a hydraulic pump connected to an input drive member by which the pump is driven to generate pressure in a hydraulic fluid, the pump having a first port and a second port;
    a direction of drive of the drive member being reversible so that a direction of drive of the pump is reversible between a forward direction to intake fluid into the first port and expel pressurized fluid at the second port and a reverse direction to take intake fluid into the second port and expel pressurized fluid at the first port;
    a motor driven by the pressurized fluid from the pump, the motor having a first port and a second port arranged such that supply of the pressurized fluid to the first port drives the motor in a forward direction and releases discharge fluid at the second port and such that supply of the pressurized fluid to the second port drives the motor in a reverse direction and releases discharge fluid at the first port;
    and a hydraulic circuit for connecting the pump and the motor, the hydraulic circuit comprising:
        a hydraulic fluid reservoir for receiving the discharge fluid from the motor and for supplying hydraulic intake fluid to the pump;
        a first hydraulic circuit portion including a first hydraulic line connecting fluid from the reservoir to the first port of the pump, a second hydraulic line connecting fluid between the second port of the pump and the first port of the motor, and a third hydraulic line connecting fluid from the second port of the motor to the reservoir;
        a second hydraulic circuit portion including a fourth hydraulic line connecting fluid to the second port of the motor from the first port of the pump, the fourth hydraulic line by-passing the reservoir;
        and valve means for controlling flow of fluid in the first and second hydraulic circuit portions, the valve means being operable in response to a change in the direction of drive of the pump such that, when the pump is driven in the forward direction, the hydraulic circuit causes the hydraulic fluid to pass through the first hydraulic circuit portion into and from the reservoir and, when the pump is driven in the reverse direction, the hydraulic circuit causes the hydraulic fluid to pass through the second hydraulic circuit portion by-passing the reservoir.

2. The apparatus according to claim 1 wherein the valve means is operable in response to fluid pressure at one of the first port and the second port of the pump.

3. The apparatus according to claim 1 wherein the valve means includes at least one check valve.

4. The apparatus according to claim 1 wherein the valve means includes:

a first one-way check valve in the first line preventing flow of fluid back to the reservoir;

a second one-way check valve in the fourth line preventing flow of fluid from the second port of the motor to the first port of the pump;

and a third check valve to prevent flow of fluid from the second port of the motor to the reservoir, the third check valve being operable in response to driving of the pump in the forward direction to allow flow of fluid from the second port of the motor to the reservoir.

5. The apparatus according to claim 4 wherein the third check valve is operable in response to fluid pressure at the second port of the pump.

6. The apparatus according to claim 1 including a second motor arranged for driving by the pressurized fluid from the pump simultaneously with said motor, the second motor having a first port and a second port arranged such that supply of the pressurized fluid to the first port drives the second motor in a forward direction and releases discharge fluid at the second port and such that supply of the pressurized fluid to the second port drives the second motor in a reverse direction and releases discharge fluid at the first port, the second motor being arranged relative to said motor such that, when the pump is driven in the forward direction, the pressurized fluid is supplied to the first port of the second motor and, when the pump is driven in the reverse direction, the pressurized fluid is delivered to the second port of the second motor.

7. The apparatus according to claim 6 wherein there is provided a further motor positioned between the second port of said motor and the reservoir for receiving fluid passing therebetween for driving the further motor in a forward direction, the valve means being arranged to prevent flow of fluid through the further motor when the pump is driven in the reverse direction such that the further motor is halted when the pump is driven in the reverse direction.

8. In a header drive for a combine harvester: the combine harvester including a feeder housing, a feeder chain assembly within the feeder housing for feeding crop material along the feeder housing and a drive assembly for driving the feeder chain assembly, the drive assembly being arranged to drive the feeder chain assembly in a forward direction for feeding the material into the combine harvester and in a reverse direction for releasing blockages occurring in the feeder housing and including a drive output member; and the header including a frame for mounting on the feeder housing and feeder means for feeding crop material into the feeder housing;

a hydraulic drive apparatus for driving the feeder means from the feeder chain assembly of the combine harvester, the hydraulic drive apparatus comprising:

a hydraulic pump connected to the output drive member drive member by which the pump is driven to generate pressure in a hydraulic fluid, the pump having a first port and a second port;

the drive member being reversible with the feeder chain assembly so as to drive the pump in a forward direction to intake fluid into the first port and expel pressurized fluid at the second port and in a reverse direction to intake fluid into the second port and expel pressurized fluid at the first port;

a motor for driving the feeder means arranged to be driven by the pressurized fluid from the pump, the motor having a first port and a second port arranged such that supply of the pressurized fluid to the first port drives the motor and therefore the feeder means in a forward direction and releases discharge fluid at the second port and such that supply of the pressurized fluid to the second port drives the motor and therefore the feeder means in a reverse direction and releases discharge fluid at the first port;

and a hydraulic circuit for connecting the pump and the motor, the hydraulic circuit comprising:

a hydraulic fluid reservoir for receiving the discharge fluid from the motor and for supplying hydraulic intake fluid to the pump;

a first hydraulic circuit portion including a first hydraulic line connecting fluid from the reservoir to the first port of the pump, a second hydraulic line connecting fluid between the second port of the pump and the first port of the motor, and a third hydraulic line connecting fluid from the second port of the motor to the reservoir;

a second hydraulic circuit portion including a fourth hydraulic line connecting fluid to the second port of the motor from the first port of the pump the fourth hydraulic line by-passing the reservoir;

and valve means for controlling flow of fluid in the first and second hydraulic circuit portions, the valve means being operable in response to a change in the direction of drive of the pump such that, when the pump is driven in the forward direction, the hydraulic circuit causes the hydraulic fluid to pass through the first hydraulic circuit portion into and from the reservoir and, when the pump is driven in the reverse direction, the hydraulic circuit causes the hydraulic fluid to pass through the second hydraulic circuit portion bypassing the reservoir.

9. The apparatus according to claim 8 wherein the valve means is operable in response to fluid pressure at one of the first port and the second port of the pump.

10. The apparatus according to claim 8 wherein the valve means includes at least one check valve.

11. The apparatus according to claim 8 wherein the valve means includes:

a first one-way check valve in the first line preventing flow of fluid back to the reservoir;

a second one-way check valve in the fourth line preventing flow of fluid from the second port of the motor to the first port of the pump;

and a third check valve to prevent flow of fluid from the second port of the motor to the reservoir, the third check valve being operable in response to driving of the pump in the forward direction to allow flow of fluid from the second port of the motor to the reservoir.

12. The apparatus according to claim 11 wherein the third check valve is operable in response to fluid pressure at the second port of the pump.

13. The apparatus according to claim 8 including a second motor arranged for driving by the pressurized fluid from the pump simultaneously with said motor, the second motor having a first port and a second port arranged such that supply of the pressurized fluid to the first port drives the second motor in a forward direction and releases discharge fluid at the second port and such that supply of the pressurized fluid to the second port drives the second motor in a reverse direction and releases discharge fluid at the first port, the second motor being arranged relative to said motor such that, when the pump is driven in the forward direction, the pressurized fluid is supplied to the first port of the second motor and, when the pump is driven in the reverse direction, the pressurized fluid is delivered to the second port of the second motor.

14. The apparatus according to claim 13 wherein there is provided a further motor positioned between the second port of said motor and the reservoir for receiving fluid passing therebetween for driving the further motor in a forward direction, the valve means being arranged to prevent flow of fluid through the further motor when the pump is driven in the reverse direction such that the further motor is halted when the pump is driven in the reverse direction.

\* \* \* \* \*